(12) United States Patent
Nakajima et al.

(10) Patent No.: US 6,170,601 B1
(45) Date of Patent: Jan. 9, 2001

(54) BOREHOLE SEISMIC TOOL

(75) Inventors: Hiroshi Nakajima, Sagamihara; Juei Igarashi, Yokohama; Akira Kamiya, Sagamihara, all of (JP)

(73) Assignee: Schlumberger Technology Corporation, Sugar Land, TX (US)

( * ) Notice: Under 35 U.S.C. 154(b), the term of this patent shall be extended for 0 days.

(21) Appl. No.: 09/508,481

(22) PCT Filed: Jul. 10, 1998

(86) PCT No.: PCT/IB98/01054

§ 371 Date: Mar. 10, 2000

§ 102(e) Date: Mar. 10, 2000

(87) PCT Pub. No.: WO00/03270

PCT Pub. Date: Jan. 20, 2000

(51) Int. Cl.[7] .................................................... G01V 1/40
(52) U.S. Cl. ........................................... 181/102; 367/911
(58) Field of Search ................................. 181/102–106; 367/25, 86, 911, 912

(56) References Cited

U.S. PATENT DOCUMENTS

| 4,563,757 | 1/1986 | Decorps et al. . |
|---|---|---|
| 4,575,831 | 3/1986 | Decorps et al. . |
| 4,811,814 | 3/1989 | Staron et al. . |
| 4,874,060 | 10/1989 | Guerendel et al. . |
| 4,987,969 | 1/1991 | Boyle et al. . |
| 5,200,581 | 4/1993 | Boyle et al. . |
| 5,864,099 | * 1/1999 | Wittrisch et al. ..................... 181/102 |

* cited by examiner

*Primary Examiner*—Khanh Dang
(74) *Attorney, Agent, or Firm*—Steven L. Christian

(57) ABSTRACT

A borehole seismic shuttle tool includes (a) a tool body having a cavity with an opening in the wall of the tool body; (b) an anchoring arm attached to the tool body and operable to anchor the tool body to the borehole wall; (c) a sensor package positioned in the cavity and mounted on resilient mounts which act to urge the sensor package in the direction of the opening, such that when the tool body is anchored to the borehole wall, the sensor package projects part way through the opening and is held against the borehole wall by the action of the resilient mounts. The tool is characterised in that when the tool body is not in contact with the borehole wall, peripheral portions of the sensor package is urged into contact with the tool body wall surrounding the opening.

13 Claims, 6 Drawing Sheets

FIG. 1a
FIG. 1b
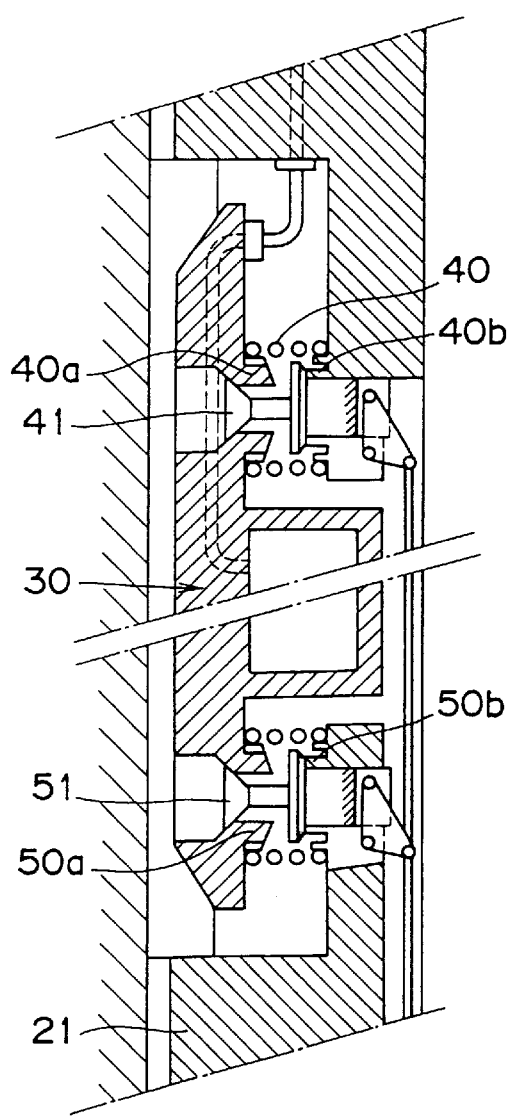
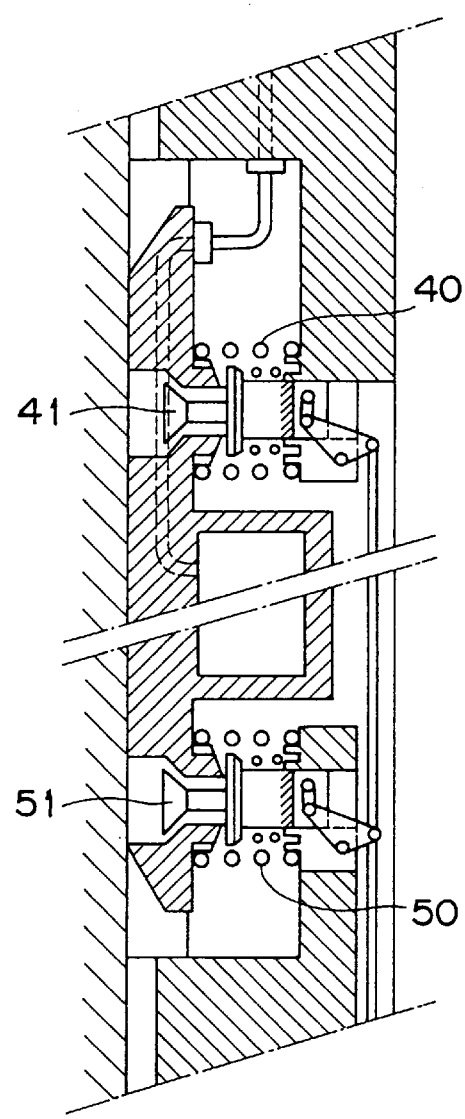

F I G. 2a
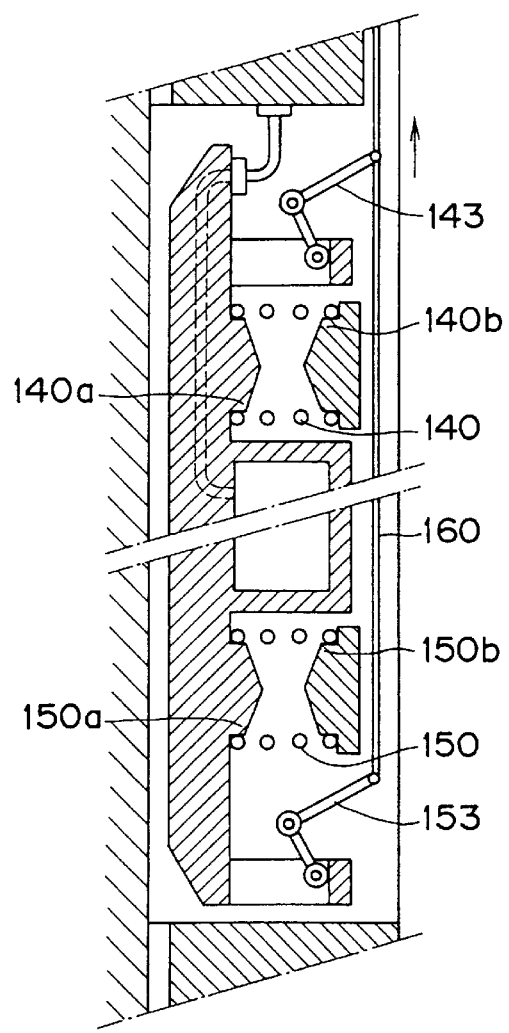
F I G. 2b
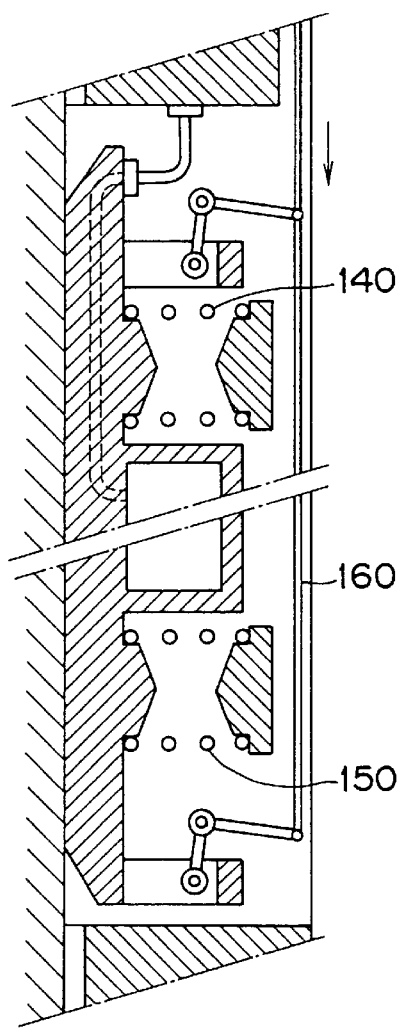

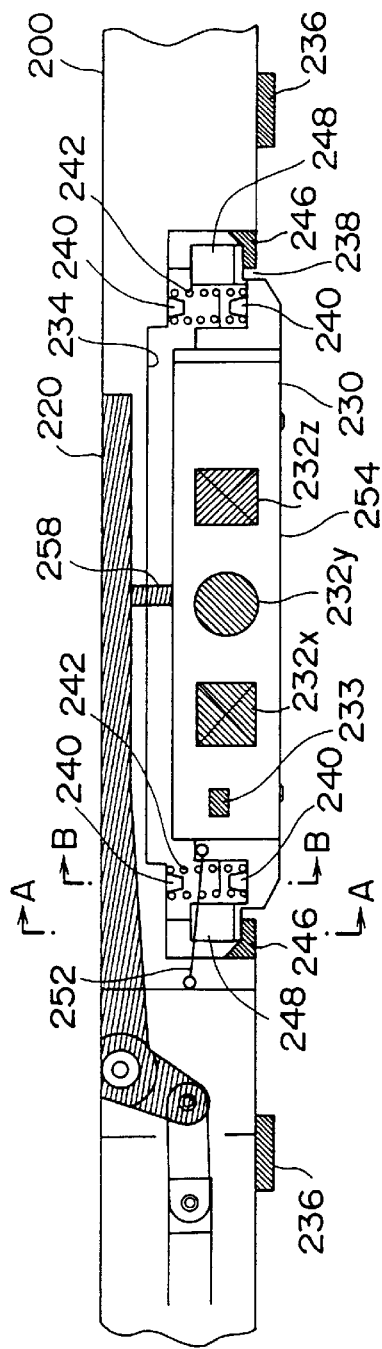

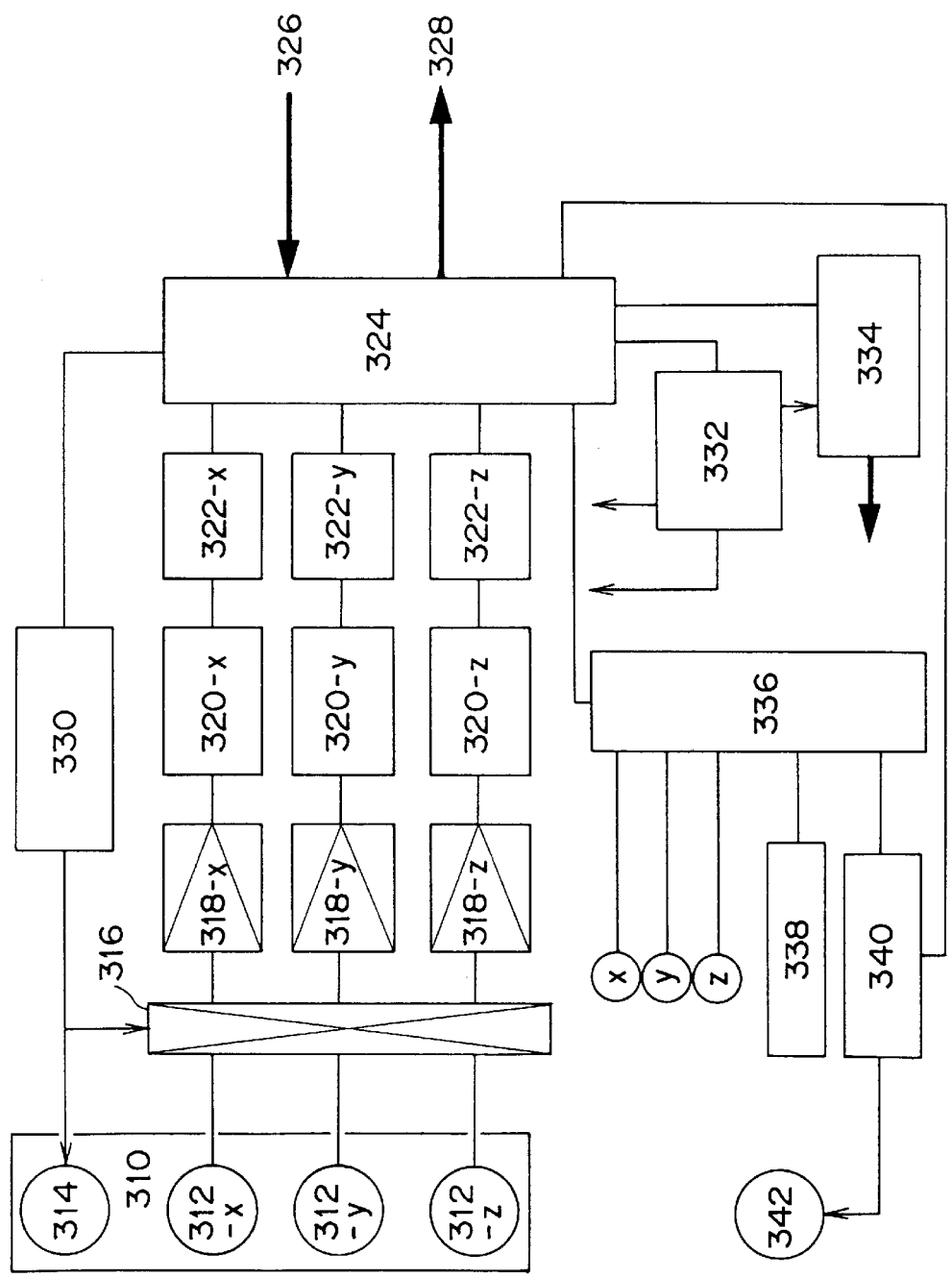

BOREHOLE SEISMIC TOOL

TECHNICAL FIELD

The present invention relates to borehole logging tools, and in particular to aspects of a sensor package for a seismic logging tool in which the sensor package is urged against the wall of a borehole.

BACKGROUND ART

Seismic logging tools are know for use in performing vertical seismic profile surveys from boreholes to evaluate the surrounding underground formations. The tools can be single sondes or multi-shuttle tools comprising a number of similar sondes (shuttles) linked together by means of a cable and logged through a borehole while seismic signals are generated at the surface. At each measurement level, each shuttle is anchored to the wall of the borehole during a measurement operation by means of an anchoring arm. The sensors (geophones or geophone accelerometers) are mounted in packages which are located in the tool body in such a way that they are isolated from the vibrational behaviour of the tool when anchored in the borehole. This is typically done by spring-mounting the sensor package in the tool and clamping the tool body securely to the borehole wall (by anchoring the tool as described above) when measurement are to be made. One such seismic logging tool is Schlumberger's Combinable Seismic Imager tool (CSI). Aspects of the CSI are described in U.S. Pat. No. 4,563,757; U.S. Pat. No. 4,575,831; U.S. Pat. No. 4,987,969; and U.S. Pat. No. 5,200,581. In particular, patents '969 and '581 relate in particular to the sensor package and deployment. Schematic figures from the patents is shown in FIGS. 1a–b and 2a–b. FIGS. 1a and 1b show a sensor package 30 which is housed in a cavity in the tool body 21. The package is connected to the tool body by a resilient suspension formed from two coil compression springs 40, 50 which locate around centring studs 40a, 50a, 40b, 50b, on the package 30 and tool body 21. Retraction actuators 41, 51 pass through the coil springs and engage in bores in the package 30. In the retracted position, the actuators are withdrawn such that the flared ends engage in the bores and pull the package into the cavity against the action of the springs. Thus the package is held within the cavity and is protected from mechanical damage when running in or pulling out of hole. When the tool is deployed and the tool body anchored against the borehole wall, the actuators are released and the package is pressed against the borehole wall by the action of the springs.

FIGS. 2a and 2b show an alternative system which still uses springs 140, 150 and centring studs 140a, 140b, 150a, 150b, but the actuators and bores are replaced by a system of a rod 160 and rockers 143, 153. Pulling on the rod causes the rockers to retract the sensor package into the tool, while releasing the rod allows the springs to force the package out of the cavity as before.

In both cases, the tool includes an active system for retracting the sensor package into the tool body. This adds to the size, weight and complexity of the sonde which can be significant where a number of sondes are to be linked together as in a shuttle tool.

Other prior art systems are described in U.S. Pat. No. 4,874,060 and U.S. Pat. No. 4,811,814; Borehole seismic shuttle tools currently used also include the SST500 of Compagnie General de Geophysique and the seismic shuttle tools of VNIIGIS/OZGA.

The present invention has as its object a tool in which the use of a retracting mechanism is avoided while still providing for secure location of the sensor package in the tool.

DISCLOSURE OF INVENTION

One aspect of the present invention provides a borehole tool comprising (a) a tool body having a cavity with an opening in the wall of the tool body; (b) an anchoring arm attached to the tool body and operable to anchor the tool body to the borehole wall; (c) a sensor package positioned in the cavity and mounted on resilient mounts which act to urge the sensor package in the direction of the opening, such that when the tool body is anchored to the borehole wall, the sensor package projects part way through the opening and is held against the borehole wall by the action of the resilient mounts. A tool according to this aspect of the invention is characterised in that when the tool body is not in contact with the borehole wall, peripheral portions of the sensor package is urged into contact with the tool body wall surrounding the opening.

The provision of resilient mounts for the sensor package provides acoustic isolation when the tool is anchored to the borehole wall such that vibrations of the tool body are not communicated to the sensor package and so do not interfere with the formation measurement.

The resilient mounts are typically compression springs although any other form of resilient mount can be used, such as silicone rubber, provided that its natural action is to urge the sensor package towards the opening. Unlike the prior art tools, there is no retraction mechanism. Thus, the normal, unanchored position for the sensor package is to project part way through the opening. The tool body surrounding the opening is preferably formed with shaped seats, the sensor package having correspondingly shaped peripheral portions to locate the package when urged against the tool body. The seats can be shaped such that the package normally assumes the same position when not in contact with the borehole wall.

The action of the mounts is to move the package radially with respect to the tool body. Axial movement can be prevented by providing a connecting member connected to the tool body and preferably flexible to ensure acoustic isolation from the tool body when anchored to the borehole wall.

An operable package backup pad can also be provided to hold the package in the seats, especially when the tool is run into the borehole or pulled out of the borehole at higher speeds that are normally encountered in logging activities. In one embodiment, the backup pad is located on the anchoring arm and bears on the package when the arm is retracted against the tool body. When the arm is extended but not anchored, the case when the tool is moved between measurement levels in the borehole, the package is held in the seats by the resilient mounts.

A further embodiment of the invention also has means for securing the package to the tool body around the opening so that the anchoring of the tool body to the borehole wall is sufficient to apply the sensor package to the borehole wall (i.e. the two are acoustically coupled instead of being isolated).

By avoiding the use of a retraction mechanism, the tool can be made much more compact and lighter

BRIEF DESCRIPTION OF DRAWINGS

FIGS. 1a–b show schematic views of a prior art tool;

FIGS. 2a–b show schematic views of another prior art tool;

FIG. 4 shows a partial cross section through a sonde incorporating the invention;

FIG. 5 shows a cross section on line AA of FIG. 4;

FIG. 6 shows a cross section on line BB of FIG. 4;

FIG. 7 shows a plan-view cross section of the sections shown in FIGS. 5 and 6;

FIG. 10 shows a schematic diagram of the electronics section of the sonde.

BEST MODE FOR CARRYING OUT THE INVENTION

Figure 3:
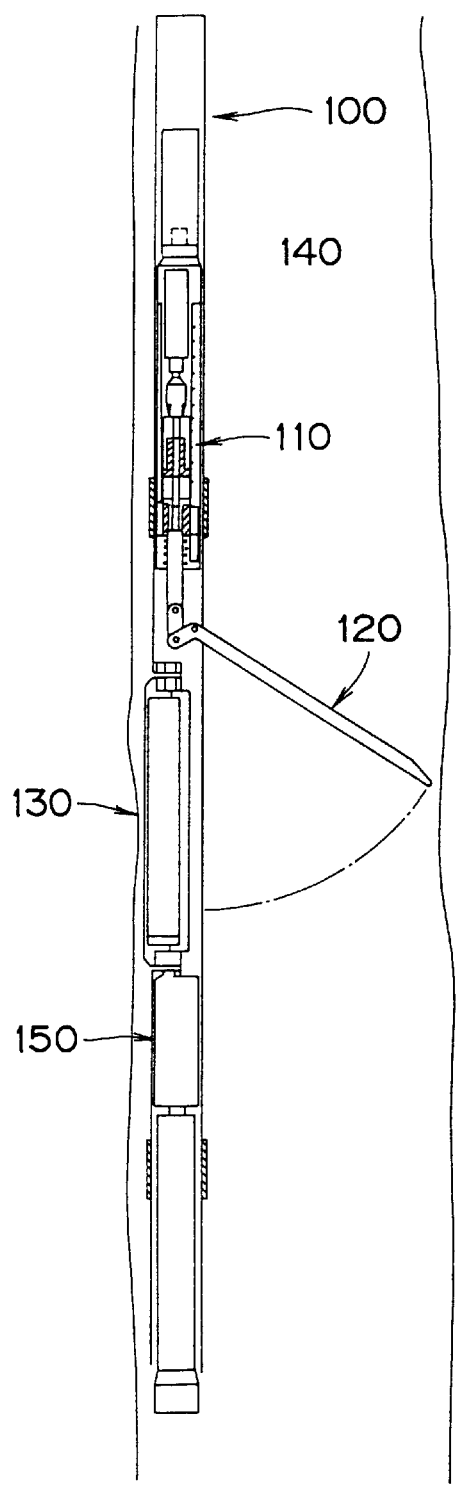
FIG. 3 shows a general view of a sonde incorporating the present invention.

The present invention finds particular application in multi-shuttle seismic logging tools. Such tools are used in VSP surveys and comprise a number of identical or similar shuttles connected in end-to-end fashion by cable. A single shuttle/sonde is shown in FIG. 3 comprises a tool body 100, an anchoring mechanism 110 including an anchoring arm 120, a sensor package 130 and sonde electronics 150. In use, a number of these shuttles, from 2 to 20, typically 4 to 8, are connected together and logged through the borehole 140.

FIGS. 4, 5, 6 and 7 show part of the tool body 200 including the anchoring arm 220 and sensor package 230. The sensor package 230 includes three geophone-accelerometers 232-x, -y, -z for detecting vibrations in orthogonal x, y and z directions and a shaker 233 for generating test signals. The output of the geophone-accelerometers is passed to the sonde electronics package (150 in FIG. 3, omitted here for clarity but described in relation to FIG. 10 below). The sensor package 230 is located in a cavity 234 formed in the tool body 200 which also carries the anchoring arm 220 and contact shoes 236. The cavity 234 is provided with an elongate opening 238 which allows the sensor package 230 to project outwardly from the tool body 200. Four sets of opposed centring studs 240 are provided on the sensor package 230 and the tool body 200 inside the cavity 234 and four compression springs 242 are mounted on the studs 240. The effect of the compression springs 242 is to urge the sensor package 230 radially outwards from the tool body 200. The parts 244 of the tool body 200 at either end of the opening 238 are formed with shaped seats 246. The corresponding end portions 248 of the sensor package 230 have a complimentary shape. The effect of the shape of the seats 246 and end portions 248 is that when the tool is not in contact with the borehole wall 250, the sensor package 230 is located in a given position by the effect of the springs 242 and seats 246, the outer part of the sensor package 230 projecting from the opening 238 but the seats 246 preventing the package 230 from being completely ejected from the cavity 234. The seats 246 have a lining 247 of a resilient material such as rubber or silicone rubber. The lining 247 allows some contact of the end portions 248 in the seats while still maintaining a degree of acoustic isolation even if there is contact during measurement. The sensor package 230 is also restrained by a locating wire 252 which restricts axial movement of the sensor package 230 in the cavity 234. The outward facing surface 254 of the sensor package 230 has three contact shoes 256 which prevent direct contact of the sensor package 230 with the borehole wall 250.

In FIGS. 4, 5, 6 and 7, the tool is shown with the anchoring arm 220 retracted against the tool body 200. The anchoring arm 220 also carries a backup pad 258 which bears against the back of the sensor package 230 and holds it securely in the seats 246 against any incidental contact with the borehole wall 250. This is the configuration used when running in or pulling out of hole. Since this is normally done at a much higher speed than when logging, the potential damage due to contact with the borehole wall is much higher. Consequently, the package is anchored in the cavity by the backup pad.

Figure 8:
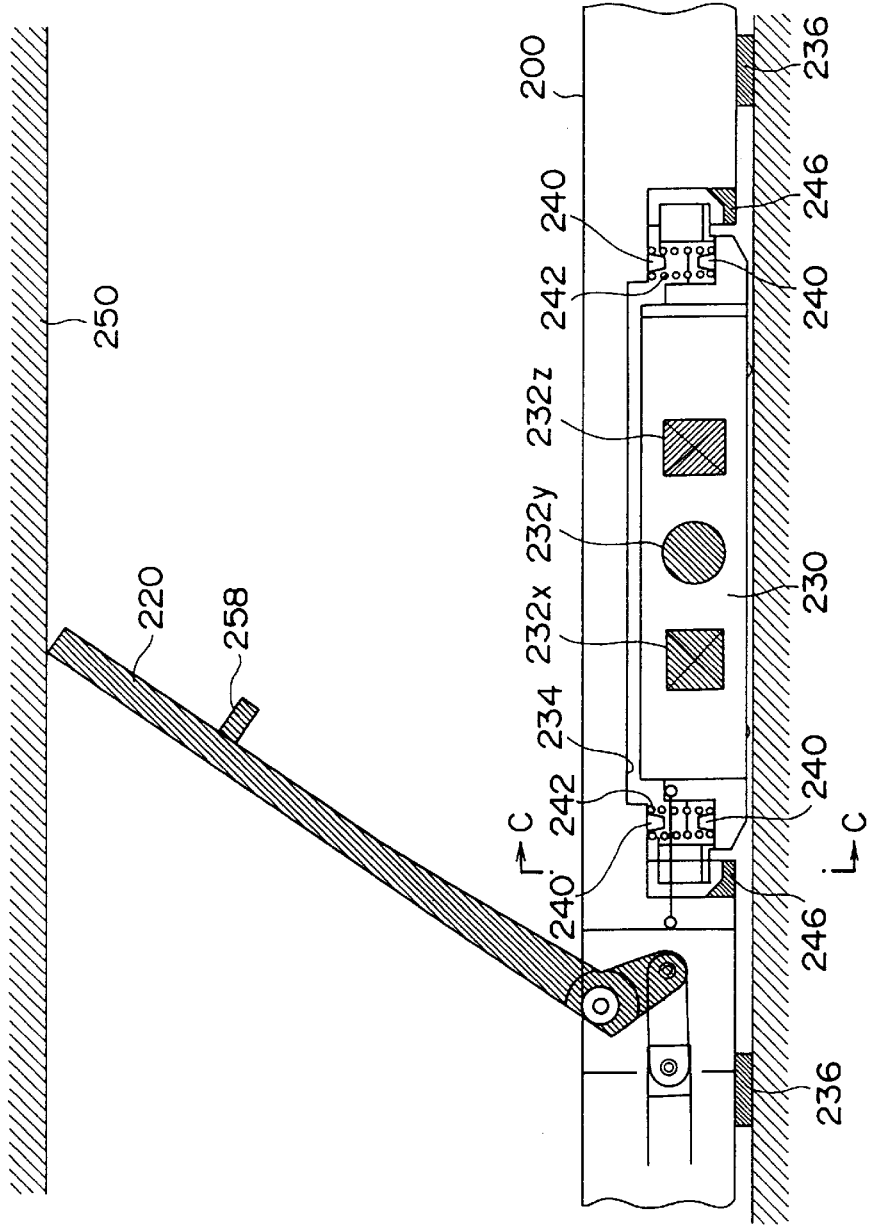
FIG. 8 shows the sonde of FIG. 4 in an alternative configuration.
Figure 9:
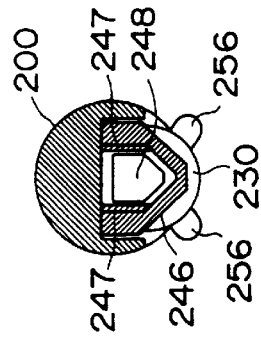
FIG. 9 shows a cross section on line XX of FIG. 8.

When the tool is deployed for logging, as shown in FIGS. 8 and 9, the anchoring arm 220 is extended (see International Patent Application No. PCT/IB98/00832 for details of the actuating mechanism for the anchoring arm). When fully extended against the borehole wall 250, the arm 220 acts to force the tool body 200 against the opposite side of the borehole (the shoes 236 acting as the contact points for the tool body 200). Since the sensor package contact shoes 256 project beyond the tool body shoes 236, contact with the borehole wall 250 causes the sensor package 230 to be lifted out of the seats 246 against the action of the springs 242. Thus the only contact between the sensor package 230 and the tool body 200 is through the springs 242 (and locating wire 252) which provide effective acoustic isolation of the package 230 and body 200.

It will be appreciated that the number of compression springs can be chosen to suit requirements. Also, the stiffness of these springs will affect the degree of acoustic coupling between the sensor package 230 and the tool body 200. An alternative to compression springs is the use of resilient silicone rubber mounts. Other forms of mount or material can also be used. Using such mounts as acoustic isolators should at least allow isolation of vibrations above 40 Hz depending on the choice of materials and design.

The shape and number of seats 246 and the corresponding parts of the sensor package can also be changed from those described above, according to requirements.

The geophone-accelerometers can be any suitable sensor, including geophones and/or accelerometers.

FIG. 10 shows the sonde electronics section (150 of FIG. 3). The sensor package 310 contains the three geophone-accelerometers 312-x, -y, -z and the shaker 314. The geophone-accelerometers 312 merely detect vibrations and output a signal. The shaker generates vibrations for test measurements and takes a test signal input. The geophone-accelerometer output signals are fed to an input switch 316 which passes each signal to a respective pre-amp 318-x, -y, -z. From the pre-amp 318, the signal passes to 24 bit $\Sigma$-$\Delta$ converters 320-x, -y, -z and digital filters 322-x, -y, -z. The output from the digital filters 322 passes to the shuttle network interface 324 which provides a communication interface to the shuttle above 326 (or the control and telemetry cartridges if this is the top shuttle) and the shuttle below 328 (if there is one). The shuttle interface 324 also outputs control signals to the test signal generator 330 for activating the shaker 314 and providing a further input to the input switch 316. Other inputs/outputs of the shuttle network interface 324 include synch and clock recovery 332 for the $\Sigma$-$\Delta$ converters 320, DC/DC power supply 334, auxiliary A/D convertor 336 having x, y and z, anchor arm position sensor 338 and motor control 340 for driving the arm motor 342.

INDUSTRIAL APPLICABILITY

The present invention finds application in the field of borehole logging tools, particularly seismic multi-shuttle logging tools which can be used to evaluate the formations surrounding boreholes such as are drilled for the extraction of hydrocarbons or geothermal energy.

What is claimed is:

1. A seismic borehole logging tool, comprising:
   (a) a tool body defining a cavity with an opening in a wall of the tool body;
   (b) an anchoring arm attached to the tool body and operable to anchor the tool body to a borehole wall;
   (c) a sensor package positioned in the cavity and mounted on resilient mounts which act to urge the sensor package in the direction of the opening, such that when the tool body is anchored to the borehole wall, the sensor package projects part way through the opening and is held against the borehole wall by the action of the resilient mounts, and when the tool body is not in contact with the borehole wall, the sensor package is urged into contact with the tool body wall surrounding the opening.

2. A logging tool as claimed in claim 1, wherein the resilient mounts comprise compression springs.

3. A logging tool as claimed in claim 1, wherein the resilient mounts comprise silicon rubber.

4. A logging tool as claimed in claim 1, wherein the tool body wall surrounding the opening is formed with shaped seats and the sensor package has correspondingly shaped peripheral portions.

5. A logging tool as claimed in claim 4, wherein a resilient lining is provided between the seat and the peripheral portions.

6. A logging tool as claimed in claim 1, further comprising a backup pad operable to hold the sensor package against the tool body.

7. A logging tool as claimed in claim 1, wherein the anchoring arm is moveable between a first position in which it is retracted against the tool body and a second position in which it is extended away from the tool body in order to engage the borehole wall.

8. A logging tool as claimed in claim 7, wherein the backup pad is mounted on the anchoring arm and bears against the sensor package when the arm is retracted against the tool body.

9. A logging tool as claimed in claim 1, wherein the sensor package comprises at least one geophone.

10. A logging tool as claimed in claim 9, wherein electronics associated with the or each geophone is located in the tool body.

11. A logging tool as claimed in claim 1, further comprising a connecting member which limits axial movement of the sensor package when the tool is moved along the borehole.

12. A logging tool as claimed in claim 11, wherein the connecting member is flexible.

13. A borehole logging tool comprising a series of logging tools linked in an end-to-end arrangement, each tool comprising:
   (a) a tool body defining a cavity with an opening in a wall of the tool body;
   (b) an anchoring arm attached to the tool body and operable to anchor the tool body to a borehole wall;
   (c) a sensor package positioned in the cavity and mounted on resilient mounts which act to urge the sensor package in the direction of the opening, such that when the tool body is anchored to the borehole wall, the sensor package projects part way through the opening and is held against the borehole wall by the action of the resilient mounts, and when the tool body is not in contact with the borehole wall, the sensor package is urged into contact with the tool body wall surrounding the opening.

* * * * *